United States Patent
Emori et al.

(10) Patent No.: US 6,680,600 B2
(45) Date of Patent: Jan. 20, 2004

(54) POWER SUPPLY UNIT, DISTRIBUTED POWER SUPPLY SYSTEM AND ELECTRIC VEHICLE LOADED THEREWITH

(75) Inventors: Akihiko Emori, Hitachi (JP); Takuya Kinoshita, Hitachi (JP); Hideki Miyazaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/083,645

(22) Filed: Feb. 27, 2002

(65) Prior Publication Data

US 2003/0094923 A1 May 22, 2003

(30) Foreign Application Priority Data

Nov. 22, 2001 (JP) ........................................ 2001-357879

(51) Int. Cl.⁷ .................................................. H02J 7/00
(52) U.S. Cl. ...................... 320/126; 320/104; 307/10.1
(58) Field of Search ................................ 320/126, 104; 307/10.1

(56) References Cited

U.S. PATENT DOCUMENTS

| | | | | |
|---|---|---|---|---|
| 5,488,283 A | * | 1/1996 | Dougherty et al. | ........ 307/10.1 |
| 5,557,189 A | | 9/1996 | Suzuki et al. | |
| 5,726,553 A | * | 3/1998 | Waugh | ........ 320/104 |
| 6,229,279 B1 | * | 5/2001 | Dierker | ........ 320/104 |

* cited by examiner

Primary Examiner—Gregory J. Toatley, Jr.
(74) Attorney, Agent, or Firm—McDermott, Will & Emery

(57) ABSTRACT

A power supply unit, a distributed power supply system and an electric vehicle loaded therewith, capable of charge/discharge operation are disclosed. A first cell group is connected in parallel to a second cell group in which the electrolytic solution can be electrolyzed or the generated gas can be recombined. A plurality of the parallel circuit pairs are connected in series, and the series circuit is connected with a charger/discharger to constitute the power supply unit. The charger/discharger charges the power supply unit up to a voltage at which the electrolytic solution of the second cell group is electrolyzed or the generated gas is recombined.

10 Claims, 12 Drawing Sheets

POWER SUPPLY UNIT, DISTRIBUTED POWER SUPPLY SYSTEM AND ELECTRIC VEHICLE LOADED THEREWITH

BACKGROUND OF THE INVENTION

The present invention relates to a power supply unit comprising a multiplicity of cells such as lithium secondary cells, nickel hydrogen cells, lead seal cells, electric double layer capacitors and fuel cells connected in series parallel, and a distributed power supply system and an electric vehicle including them.

In the case where a plurality of cells are connected in series, the variations of capacitance, initial voltage and temperature from one cell to another causes a different voltage for a different cell, thereby making it difficult for all the series-connected cells to share the voltage across the circuit uniformly.

Especially in the case where the lithium secondary cells or the electric double layer capacitors employing an organic solvent as an electrolytic solution are connected in series, voltage variations causes an overcharge or an overdischarge, often resulting in a rupture or a fire, or at least an overcharge or an overdischarge, which poses the problem of an extremely shortened service life of the cells.

In order to prevent the overcharge or overdischarge, the charge/discharge operation may be performed with a pre-set protective level. In charge mode, however, the charge operation stops when the voltage across a high-voltage cell has reached the protective level. As a result, the remaining low-voltage cells fail to be fully charged before the end of the charge operation.

In similar fashion, the discharge operation stops at the time point when the voltage across a low-voltage cell has reached a protective level. As a result, the remaining high-voltage cells cannot be fully discharged before the end of the discharge operation.

In the series connection of cells, therefore, the charge/discharge time becomes shorter than in the case where each cell is charged/discharged independently.

In a conventional battery charging apparatus intended to solve this problem, the charge current supplied through a bypass is changed by a current changing means progressively according as the voltage across the cells being charged approaches a set value thereby to set the cells into a uniform state. Examples are illustrated in U.S. Pat. No. 5,557,189 and a corresponding Japanese Patent No. JP-A-7-230829. FIG. 12 is a diagram showing such a battery charging apparatus. In FIG. 12, reference numerals $1101a$ to $1101c$ designate cells, numerals $1102a$ to $1102c$ voltage detection means, numeral $1103$ set voltage application means, numerals $1104a$ to $1104c$ comparison control means, and numerals $1105a$ to $1105c$ current changing means. The circuit for the cell $1101a$ is so configured that the voltage detection means $1102a$, the comparison control means $1104a$ and the current changing means $1105a$ are connected in parallel to each other, and the set voltage application means $1103$ applies a set voltage indicating the setting of a voltage value of the cell $1101a$.

The present voltage value of the cell $1101a$ is detected by the voltage detection means $1102a$, and compared in the comparison control means $1104a$ with the set value of the voltage applied by the set voltage application means $1103a$. According as the present cell voltage approaches the set voltage value, the charge current flowing in the current changing means is increased progressively. Specifically, the charge current to the cell $1101a$ is controlled progressively downward. In this way, an overcharge is prevented.

The fact about the cell $1101a$ described above equally applies to the cell $1101b$ and the cell $1101c$. In other words, the voltage detection means $1102b$, the comparison control means $1104b$ and the current changing means $1105b$ for the cell $1101b$, and the voltage detection means $1102c$, the comparison control means $1104c$ and the current changing means $1105c$ for the cell $1101c$, work exactly the same manner as the corresponding means, respectively, of the cell $1101a$.

Another example of the prior art is disclosed in JP-A-2000-78768. This is intended to correct the variations caused at the time of charging the lithium ion secondary cell and to prevent the trouble such as overcharge for an improved service life. Specifically, a negative electrolytic solution circulation pump and a positive electrolytic solution circulation pump are used for correcting the variations of the charge/discharge operation. Still another example of the prior art is disclosed in JP-A-2000-511398. This is a system for equalizing the cells and is a combination of energy storage elements that can be switched. Specifically, the charge is shifted between batteries each including a plurality of cells connected in series. The charge is pulled out of a particular battery of a higher voltage and transferred to another battery of a lower voltage.

In the conventional battery charging apparatus, a cell voltage at the time of charging is compared with a set value, and with the approach of the cell voltage to the set voltage value, the charge current is progressively diverted to the current changing means in parallel to the cells thereby to assure uniform conditions of the cells.

According to the prior art, however, the amount of current that can be diverted is greatly limited by the heat generated in the current changing means. Thus, the effect of obviating the voltage variations among the cells is reduced. The current changing means having a large thermal capacitance through which a large current can flow, on the other hand, is large in size and the system becomes bulky. Also, an electrical circuit other than the cells is required and increases the cost. The method of circulating the electrolytic solution, on the other hand, requires a pump. Also, a battery equalizer including a switch circuit for moving the charge by switching and a control circuit for the switch circuit is required.

SUMMARY OF THE INVENTION

The present invention has been developed in view of the problems described above, and the object thereof is to provide an inexpensive, compact power supply unit which can correct the voltage variations among cells connected in series.

According to this invention, there is provided a power supply unit comprising a first cell group and a second cell group connected in parallel to the first cell group, in which the electrolytic solution of the second cell group can be electrolyzed or the generated gas can be recombined. A plurality of the parallel-connected pairs are connected in series to each other and also to a charger/discharger. The charger/discharger is adapted to charge the cells at appropriate timing to a voltage at which the electrolytic solution of the second cells is electrolyzed or a voltage at which the generated gas is recombined. As a result, a plurality of parallel-connected pairs including the cells of the first cell group and the second cell group are equalized at a voltage at which the electrolytic solution of the cells of the second cell group is electrolyzed or a voltage at which the generated gas is recombined.

In the parallel-connected pair of the first cell group and the second cell group according to the invention, the first cell group and the second cell group are connected in parallel through a current limiter. The current limiter limits the current flowing between the first cell group and the second cell group, and prevents the overcurrent of the first cell group or the second cell group, thereby making it possible to protect the power supply unit at the time of a fault.

A plurality of series circuits including the parallel-connected pairs of the first cell group and the second cell group are connected in parallel. As a result, the capacitance, the output and the service life of the power supply unit can be variably increased.

In this invention, the withstanding voltage of the cells of the first cell group is set to a level higher than the withstanding voltage of the cells of the second cell group. Specifically, the electrolytic solution of the cells of the second cell group is electrolyzed or the gas is generated and recombined within the operating voltage range of the first cell group. In this way, the cells of the second cell group and the cells of the first cell group are equalized at a voltage at which the electrolytic solution is electrolyzed or the generated gas is recombined, as the case may be, in the cells of the second cell group.

According to another aspect of the invention, there is provided a power supply unit, wherein at least selected one of the first cell group and the second cell group includes a plurality of cells connected in series. This circuit includes at least an intermediate terminal for each appropriate number of the series-connected cells, in addition to a main positive terminal and a main negative terminal. The first cell group and the second cell group can be connected in parallel through the intermediate terminal and the main terminals.

According to still another aspect of the invention, there is provided a power supply unit, wherein the first cell group and the second cell group share at least one component element. As a result, the number of parts and the cost are reduced. The component element shared is preferably the electrolytic solution.

Also, carbon fiber or carbon nanotube is added to the electrodes of at least selected one of the first cell group and the second cell group. Especially in the batteries with the electrodes thereof extended or contracted at the time of charge/discharge operation, the resulting stress is relaxed by the carbon fiber or the carbon nanotube, as the case may be.

According to yet another aspect of the invention, there is provided a power supply unit, wherein the parallel-connected pairs of the first cell group and the second cell group are connected in parallel to a cell management circuit. As a result, the equalization of the voltage of the parallel-connected pairs can be enhanced and the conditions thereof can be detected.

According to a further aspect of the invention, there is provided a distributed power supply system in which a cell power supply unit including the first cell group and the second cell group is connected in parallel to a second similar power supply unit, the system comprising a charger for performing the charge operation in such a manner that in the case where the second power supply unit is deficient of power, the first power supply unit assists in supplying power, while in the case where the second power supply unit generates extra power, the charge operation is continued by a charger, using the extra power, up to a voltage at which the electrolytic solution of the cells of the second cell group of the first cell power supply unit is electrolyzed or a voltage at which the generated gas is recombined.

According a still further aspect of the invention, there is provided an electric vehicle comprising a motor-generator for driving the vehicle and regenerating power, and a cell power supply unit connected to the motor-generator, wherein the cell power supply unit includes a first cell group and a second cell group connected in parallel to the first cell group, the power supply unit further comprising a charger capable of charging the cells of the second cell group up to a voltage where the electrolytic solution of the cells of the second cell group of the cell power supply unit is electrolyzed or a voltage at which the generated gas is recombined.

The invention is applicable to various cells including the lithium secondary cells, the nickel-hydrogen cells, the lead seal cells and the electric double layer capacitors or the fuel cells connected in series parallel.

Other objects, features and advantages of the invention will become apparent from the following description of the embodiments of the invention taken in conjunction with the accompanying drawings.

DESCRIPTION OF THE INVENTION

Figure 1:
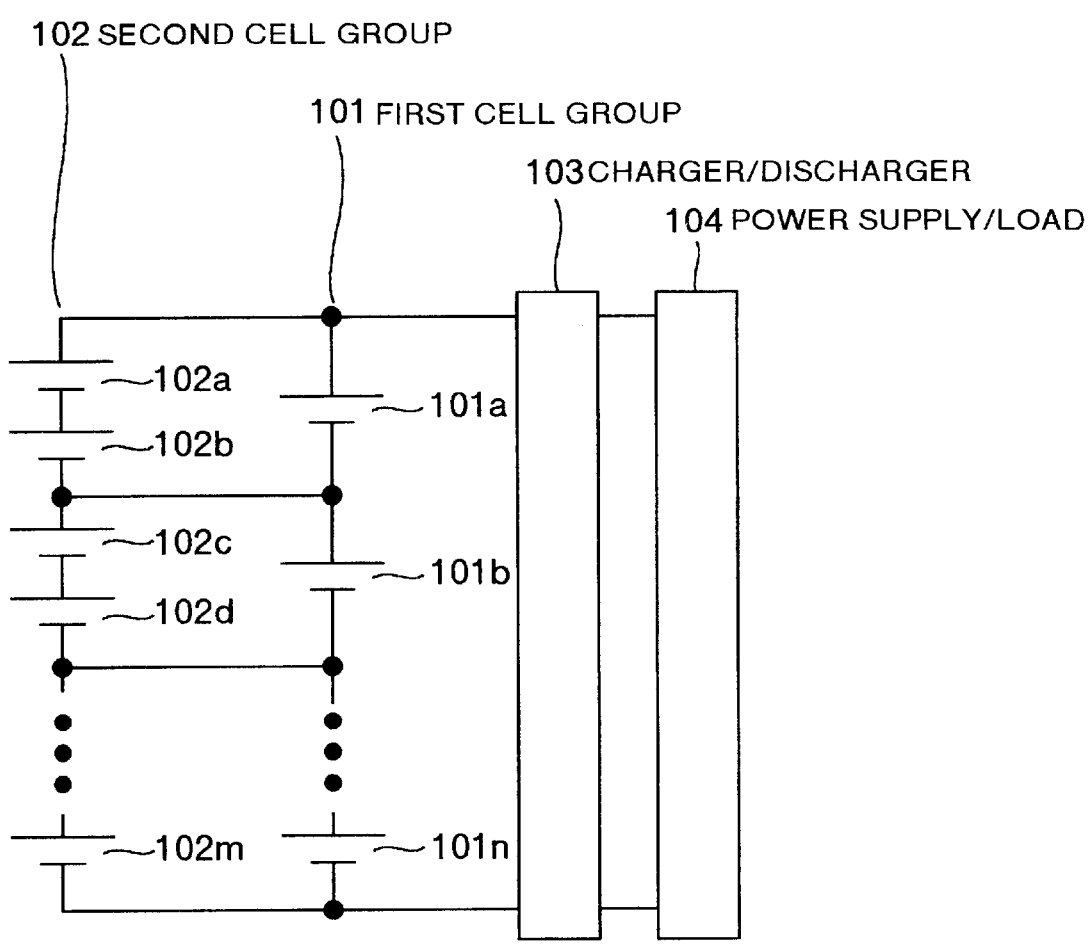
FIG. 1 is a diagram showing a first embodiment of the invention.

Embodiments of the invention will be explained below in detail with reference to the accompanying drawings. FIG. 1 is a diagram showing an embodiment of the invention. In FIG. 1, reference numeral 101 designates first cell group (101*a* to 101*n*), numeral 102 a second cell group (102*a* to 102*n*), numeral 103 a charger/discharger, and numeral 104 a power supply/load. One first cell 101 (101*a*) and two second cells 102 (102*a*, 102*b*) are connected in parallel, and a plurality of the parallel circuits are connected in series. The series-connected cell groups are connected to the charger/discharger 103 and constitute a power supply unit. This power supply unit is connected to the power supply/load 104.

In FIG. 1, the first parallel circuit including the first cell 101*a* and the second cells 102*a*, 102*b* and the second parallel circuit connected in series to the first parallel circuit and including the first cell 101b and the second cells 102c, 102d, i.e. the two series-connected stages, indicated by solid lines, constitute a minimum unit circuit of the invention. This configuration can assure a charge balance between the first cells 101a, 101b. Further, the number of the stages of the series-connection is increased to 3, 4 and so on for practical applications. The first cell group 101 includes lithium secondary cells or electrical double layer capacitors, while the second cell group 102 includes lead cells, nickel hydrogen cells, nickel cadmium cells and fuel cells capable of electrolyzing the electrolytic solution, generating and recombining the gas and refilling the electrolytic solution.

The charger/discharger 103 can be configured of a bidirectional DC/DC converter or a unidirectional charge DC/DC converter paired with a discharge DC/DC converter. This charger/discharger 103 controls the voltage and the current as suitable for the cells and the power supply/load 104. The power supply/load 104 is a commercial power supply, a generator or an ordinary electrical equipment. The charger/discharger 103 appropriately charges the second cells 102 up to a voltage at which the electrolytic solution is electrolyzed or at which the generated gas is recombined. As described above, the first cell group 101 and the second cell group 102 are connected in parallel, and these parallel circuits are connected in series to each other at least in two stages. Thus, the voltages of the first cells 101 in the configuration indicated by solid lines in FIG. 1 can be equalized by the voltage at which the electrolytic solution of the second cells is electrolyzed or at which the generated gas is recombined.

Figure 2A:
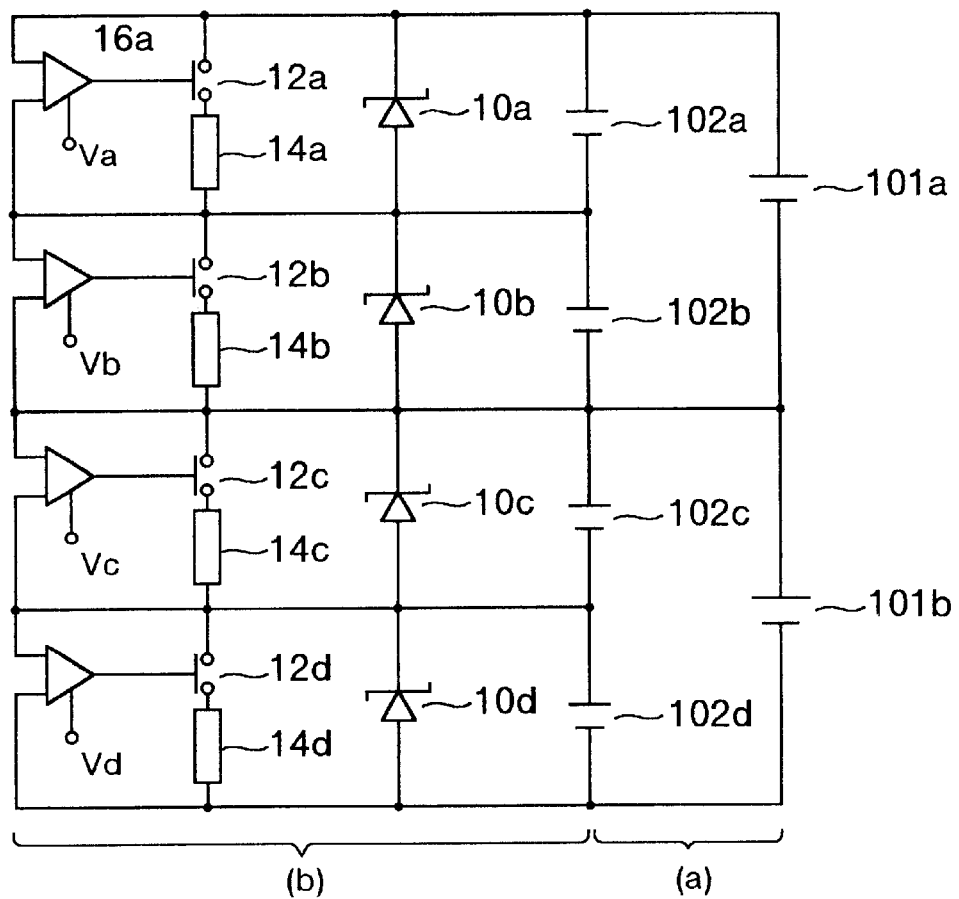
FIGS. 2A and 2B are diagrams for explaining the basic operation of the invention.

Now, the operation of equalizing the voltages of the first cells by the voltage at which the electrolytic solution of the second cells is electrolyzed or at which the generated gas is recombined, will be explained with reference to the equivalent circuit shown in FIG. 2A. In FIG. 2A, (a) represents a basic configuration of the first cell group 101 and the second cell group 102, i.e. the portion defined by the solid lines in FIG. 1, while (b) represents an equivalent circuit for explaining the operation. Numerals 10a to 10d designate elements having the zener diode characteristics, for example. Numerals 16a to 16d designate comparators, and characters Va to Vd zener voltages. In the case where the second cells come to assume a predetermined voltage by overcharge, i.e. the zener voltages Va to Vd are reached in the equivalent circuit, the comparators 16a to 16d turn off, close switches 12a to 12d and connect resistors 14a to 14d. The first cells 101 and the second cells 102 are equalized, or especially, the voltages of the first cells are equalized. The resistors 14a to 14d have the same resistance value. The second cells perform the operation similar to the equivalent circuit described above, and therefore the first cells 101 (101a, 101b) can be equalized.

In this way, the first cells 101 are combined with the second cells 102, i.e. high-output cells are combined with large-capacitance cells to realize a power supply unit apparently having a high output and a large capacitance. For example, the lithium secondary cell having a high output is used for the first cells 101, and the lead seal cell having a large capacitance is used for the second cells 102. In this case, two lead seal cells (102a, 102b) in series and one lithium secondary cell (101a) are connected in parallel to each other. This parallel circuit is further connected in series with another parallel circuit of the two lead seal cells (102c, 102d) and the one lithium secondary cell (101b).

By doing so, the voltage (overcharge voltage) of the lead seal cell at which the electrolytic solution is electrolyzed or at which the generated gas is recombined is about 2.1 V, or about 4.2 V for two such parallel circuits connected in series. On the other hand, the upper limit (withstanding voltage) of the operating voltage range of the lithium secondary cell is about 4.3 V. Therefore, the lead seal cells and the lithium secondary cells are equalized at 2.1 V×2 and 4.2 V, respectively, by the overcharged state of the lead seal cells. In other words, the terminal voltage of the series-connected lead seal cells is equalized at 4.2 V, and the terminal voltage of the lithium secondary cells at 4.2 V.

Figure 2B:
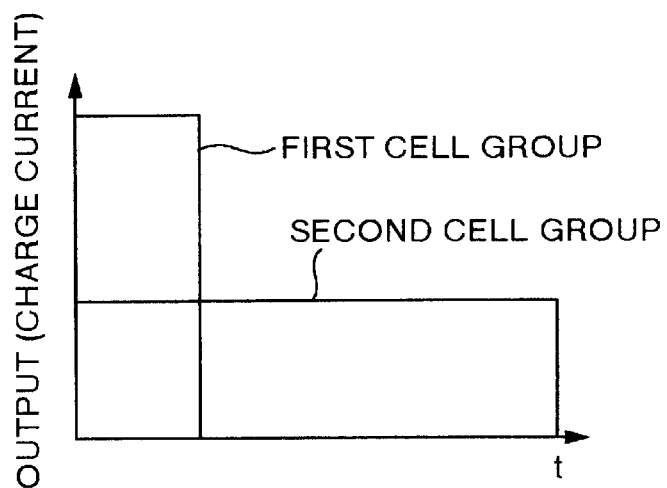

The lead seal cell, though inexpensive and large in capacitance, cannot be charged with large current, and if charged with an unreasonably large current, the service life thereof would be extremely shortened. The lithium secondary cell, on the other hand, can be charged with large current, but the cost thereof increases comparatively if increased in capacitance. By combining these two types of cells, both a high output and a large capacitance can be realized with a longer service life and a lower cost. This is schematically shown in FIG. 2B. The ordinate represents the output, which corresponds to the charge current. In other words, the first cells can be used for large-output applications, and the second cells for large-capacitance applications.

The graph of FIG. 2B also indicates that the ordinate representing the charge current, the first cells can be charged with large current for a short time, while the second cells are required to be charged with a comparatively small current for long hours. Specifically, the parallel connection of the first cell group and the second cell group makes possible cells having the dual characteristics of large output and large capacitance. These cells can be charged with a large current, and therefore, for applications to an electric vehicle described later, the charge operation can be performed by effectively utilizing the power regenerated in power regeneration mode.

Figure 3:
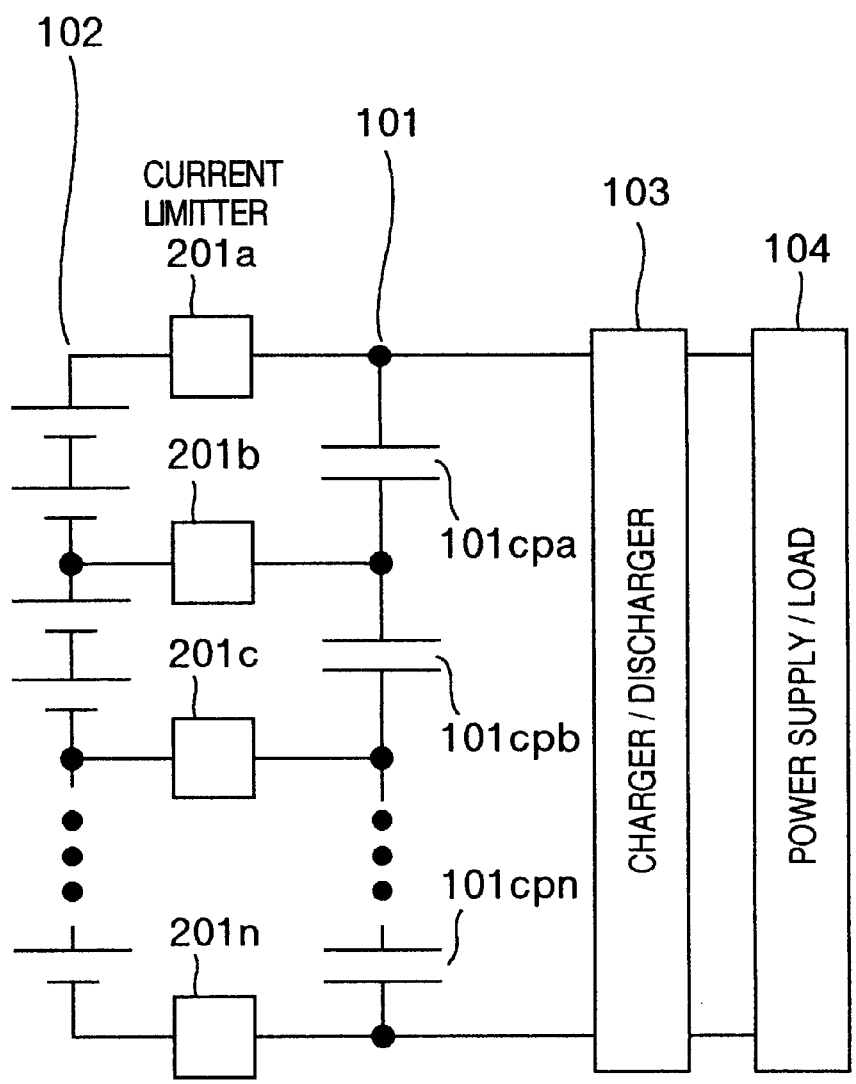
FIG. 3 is a diagram showing a second embodiment of the invention.

FIG. 3 is a diagram showing a second embodiment of the invention. In FIG. 3, numeral 201 designates a current limiter. The first cells 101 and the second cells 102 are connected in parallel to each other through the current limiters 201. FIG. 3 represents a case in which electrical double layer capacitors 101cpa to 101cpn are used as the first cells 101.

The current limiters 201 are each a PTC (positive thermal conductor) having such a characteristic as to increase the resistance with a large current, a resistor or a fuse. The current limiters 201 limit the current flowing between the first cells 101 and the second cells 102 (the current flowing from the first cells to the second cells, and the current flowing in the reverse direction) and thereby prevent an overcurrent from flowing in the cells. Also, the parallel-connected cells are prevented from being shorted in chain in the case where the first cells 101 or the second cells 102 are shorted.

Figure 4:
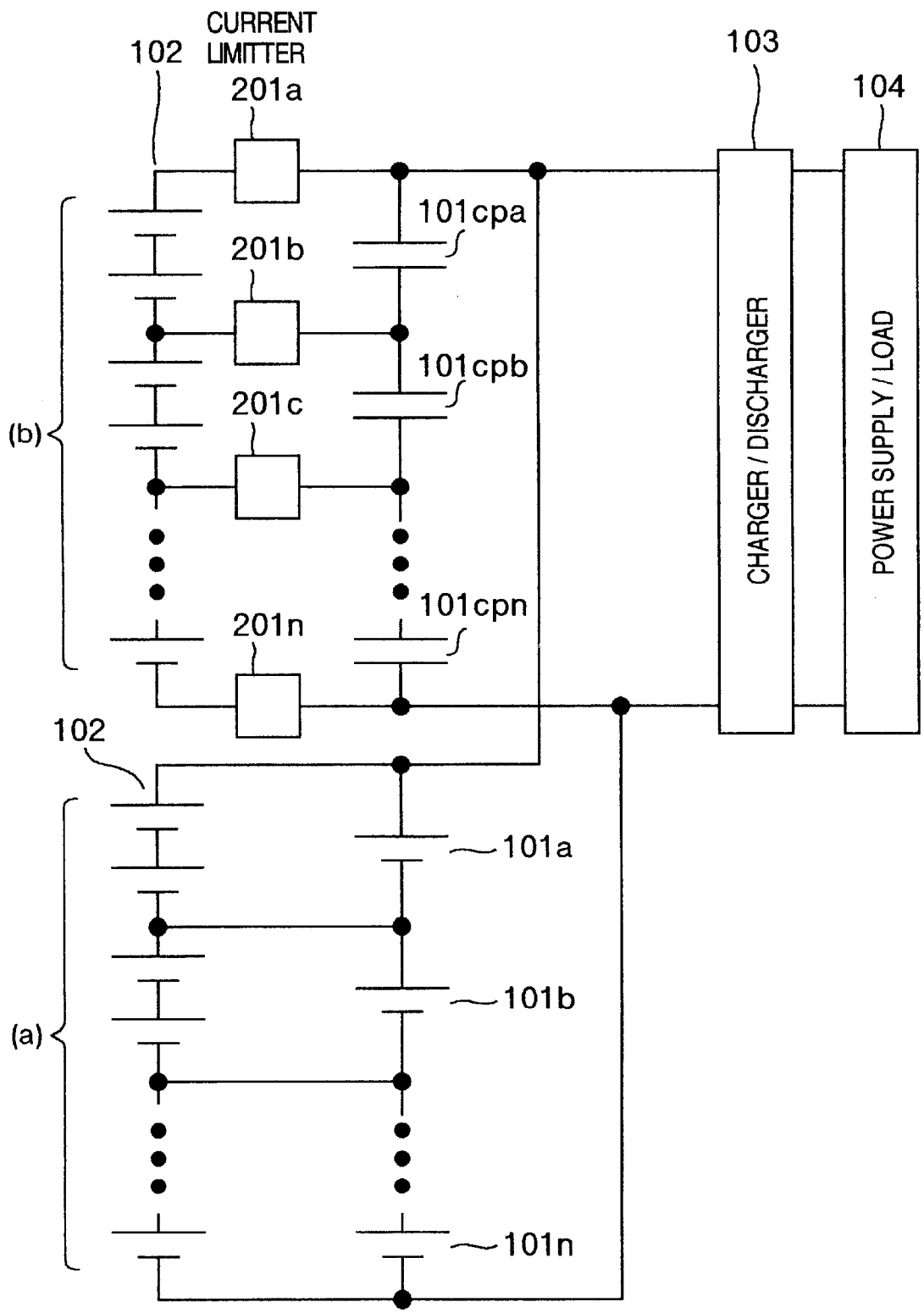
FIG. 4 is a diagram showing a third embodiment of the invention.

FIG. 4 is a diagram showing a third embodiment of the invention. In FIG. 4, the parallel circuit of the first cells 101 and the second cells 102 shown in FIG. 1 and (a) in FIG. 2 is connected in parallel to another similar parallel circuit. The charger/discharger 103 and the power supply/load 104 are also connected. A plurality of series-connected circuits are connected in parallel in this way, so that the capacitance, the output and the service life of the power supply unit can be variably increased.

Also, as in the first embodiment, the charger/discharger 103 performs the charge operation, at an appropriate timing, up to a voltage at which the electrolytic solution of the second cells 102 is electrolyzed or at which the generated gas is recombined.

As a result, in a plurality of the parallel circuits of the first cells 101 and the second cells 102 in series, the second cells 102 are equalized at a voltage at which the electrolytic solution of the second cells 102 is electrolyzed or at which the generated gas is recombined. In FIG. 4, the portion (a) corresponds to FIG. 1 or the portion (a) in FIG. 2A, while the portion (b) corresponds to the configuration of FIG. 3. These portions are connected in parallel to configure the circuit of FIG. 4.

Figure 5:
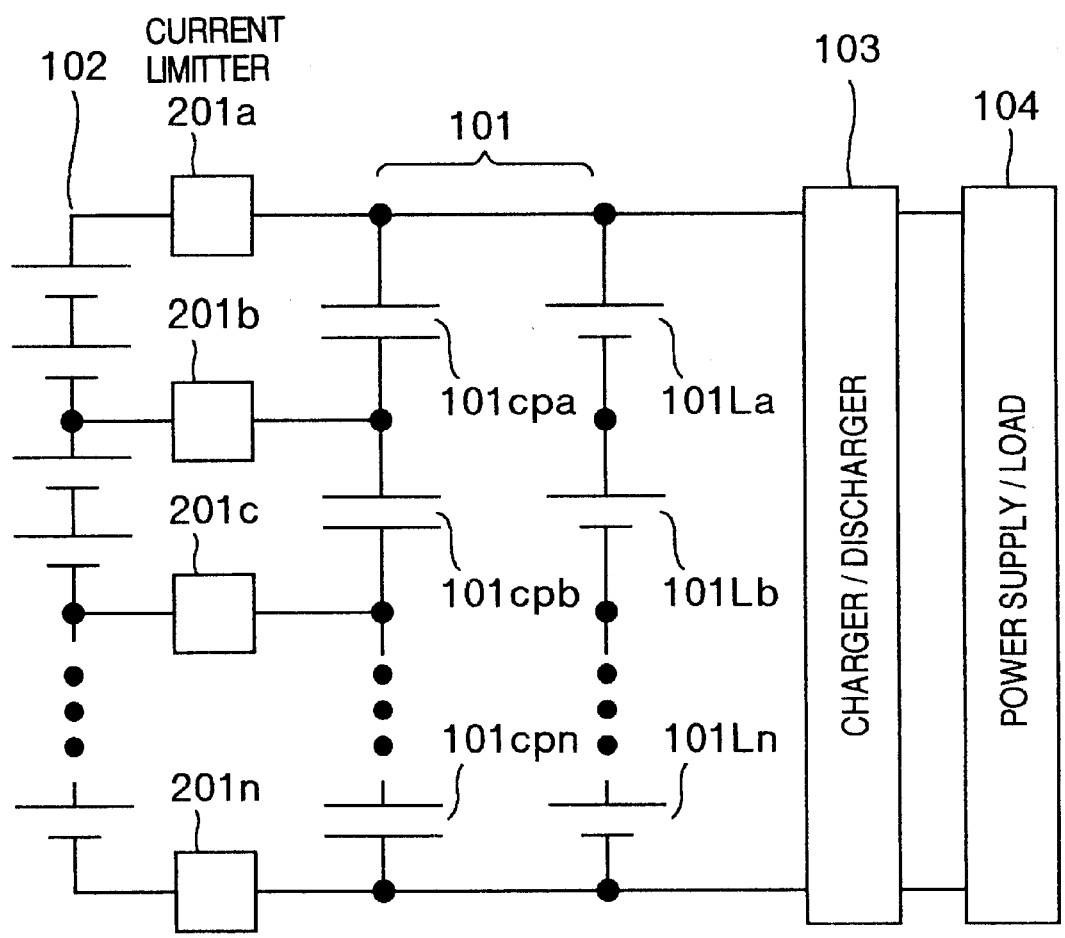
FIG. 5 is a diagram showing a fourth embodiment of the invention.

FIG. 5 is a diagram showing a fourth embodiment of the invention. In FIG. 5, the electrical double layer capacitors 101*cpa* to 101*cpn* and the lithium secondary cells 101La to 101Ln constituting the first cells 101, are connected in parallel to each other. Assuming that the lithium secondary cell is a third cell, this represents a case in which the lithium secondary cells constituting the first cells are used as the third cells. The first cell 101 and the second cell 102 are connected in parallel to each other through the corresponding current limiter 201. The series circuit including these parallel circuits is connected to the corresponding charger/discharger 103, thereby constituting a power supply unit.

The withstanding voltage of the first cells 101 (101*cpa* to 101*cpn*) and the third cells is set to a value higher than the withstanding voltage of the second cells 102. Specifically, the voltage can be equalized within the range of the operating voltage of the first cells 101 (101*cpa* to 101*cpn*) and the third cells (101La to 101Ln). More specifically, the second cells 102 are charged up to a voltage at which the electrolytic solution is electrolyzed or the generated gas is recombined, while the second cells 102 and those first cells 101 which constitute the third cells (101La to 101Ln) are charged for equalization up to a voltage at which the electrolytic solution is electrolyzed or the generated gas is recombined.

Assume that the first cells 101 (101*cpa* to 101*cpn*) are the electrical double layer capacitors having a withstanding voltage of 3.5 V, and the second cells 102 are the nickel hydrogen cells in which the electrolytic solution is electrolyzed or the gas is generated at a voltage of 1.6 V, and the third cells are the lithium secondary cells having a withstanding voltage of 4.3 V. The electrical double layer capacitors and the lithium secondary cells are equalized at 3.6 V by the overcharge of the nickel hydrogen cells.

Figure 6A:
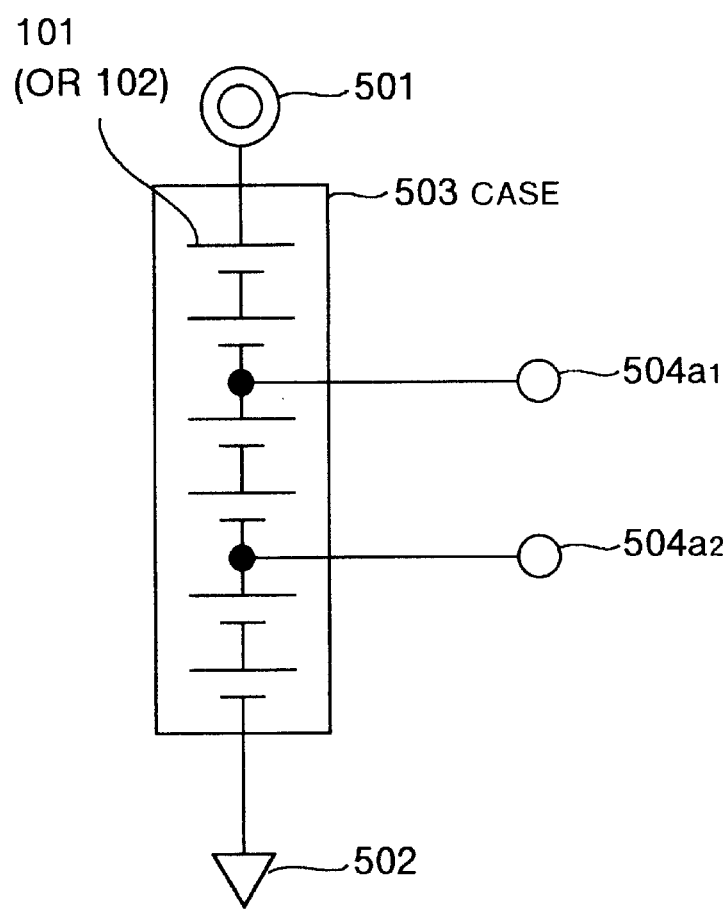
FIGS. 6A and 6B are diagrams showing a fifth embodiment of the invention.
Figure 6B:
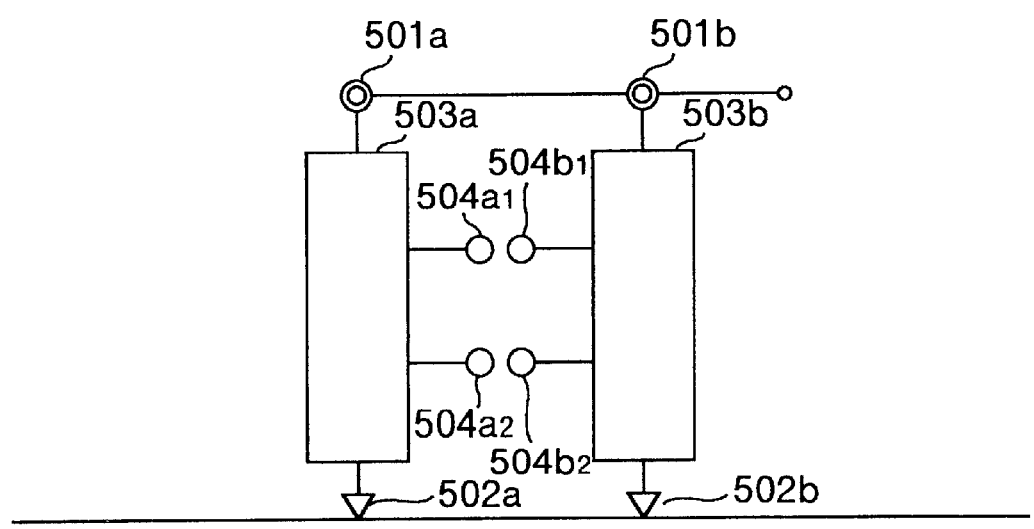

FIGS. 6A and 6B are diagrams showing a fifth embodiment of the invention. In FIG. 6A, numeral 501 designates a positive terminal, numeral 502 a negative terminal, numeral 503 a case and numeral 504 intermediate terminals. A plurality of the first cells 101 or the second cells 102 are connected in series and accommodated in the case 503. The ends of the series circuit are provided with the positive terminal 501 and the negative terminal 502 for transmitting and receiving power. Further, the intermediate terminal 504 is arranged for each series-connected two cells.

Additional first cells 101 or second cells 102 can be connected in parallel to this circuit through the intermediate terminals 504, the positive terminal 501 and the negative terminal 502. FIG. 6B is the manner in which the cells accommodated in the cases 503*a*, 503*b* are connected in parallel. Numerals 504*a*1, 504*a*2 designate the intermediate terminals of the cells accommodated in the case 503*a*. Numerals 504*b*1 and 504*b*2 designate the intermediate terminals of the cells accommodated in the case 503*b*. By interconnecting these terminals, the series circuits shown in FIG. 6A can be connected in parallel to each other.

Figure 7:
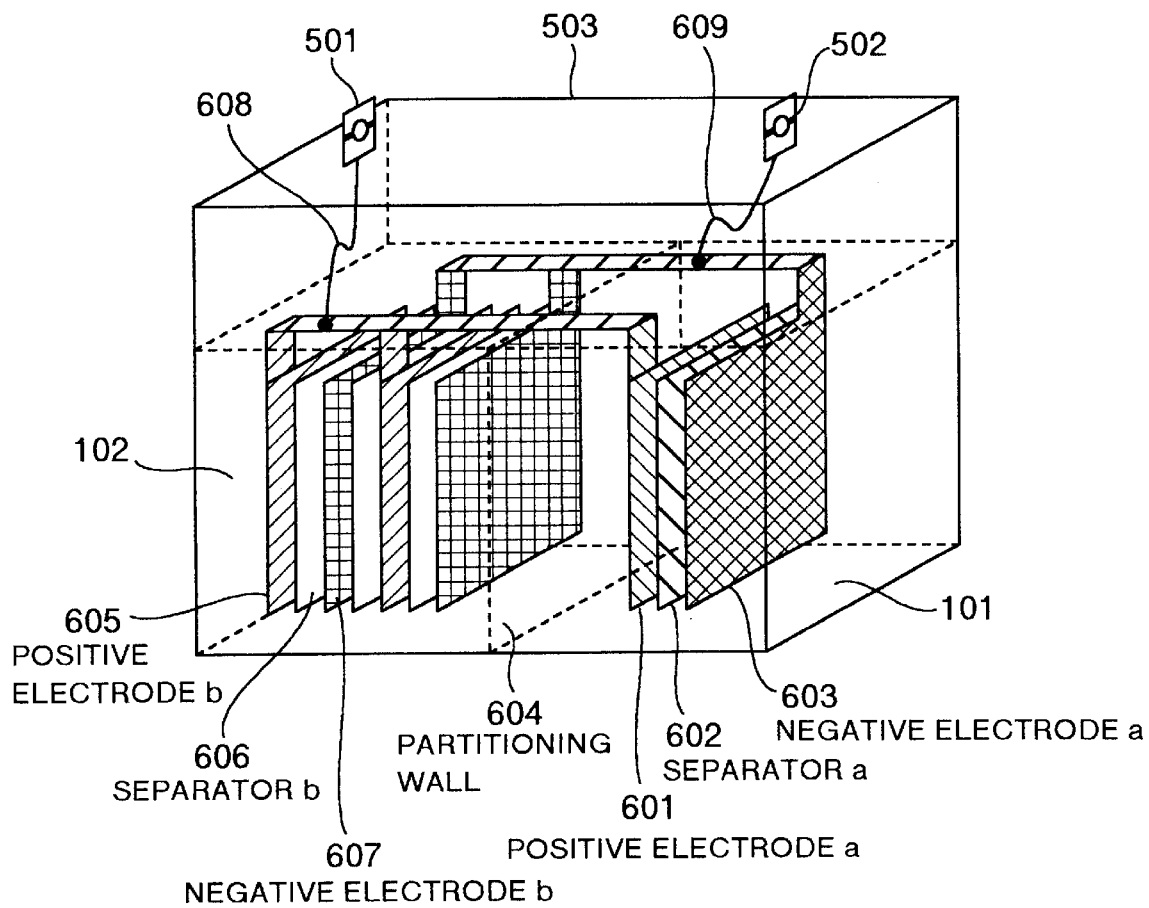
FIG. 7 is a diagram showing a sixth embodiment of the invention.

FIG. 7 is a diagram showing a sixth embodiment of the invention. In FIG. 7, numeral 601 designates a positive electrode a, numeral 602 a separator a, numeral 603 a negative electrode a, and numeral 604 a partitioning wall, the components making up the first cell 101. Also, numeral 605 designates a positive electrode b, numeral 606 a separator b, and numeral 607 a negative electrode b, all the component parts making up the second cell 102. Numeral 608 designates a positive lead wire, and numeral 609 a negative lead wire.

The positive electrode a 601, the separator a 602 and the negative electrode a 603 are arranged in that order and immersed in the electrolytic solution (not shown), thereby making up a part of the component elements of the first cell 101. Also, the positive electrode b 605, the separator b 606 and the negative electrode b 607 are arranged in that order, and immersed in the electrolytic solution (not shown), thereby constituting a part of the component elements of the second cell 102.

These component elements are separated from each other spatially by the partitioning wall 604 and accommodated in a common case 503. Also, the positive electrode a 601, the positive electrode b 605 and the positive terminal 501 are connected by the positive lead wire 608. In similar fashion, the negative electrode b 603, the negative electrode b 607 and the negative terminal 502 are connected by the negative lead wire 609.

In this case, as compared with the configuration in which the first cell 101 and the second cell 102 are configured independently of each other, each of the component elements such as the positive terminal 501, the negative terminal 502, the positive lead wire 608, the negative lead wire 609 and the case 503 is shared, which make up a parallel circuit pair. Further, though not shown, a protective mechanism and protective devices including an explosion-proof valve and a pressure switch can also be shared. As a result, the number of parts and the power cost can be reduced.

Figure 8:
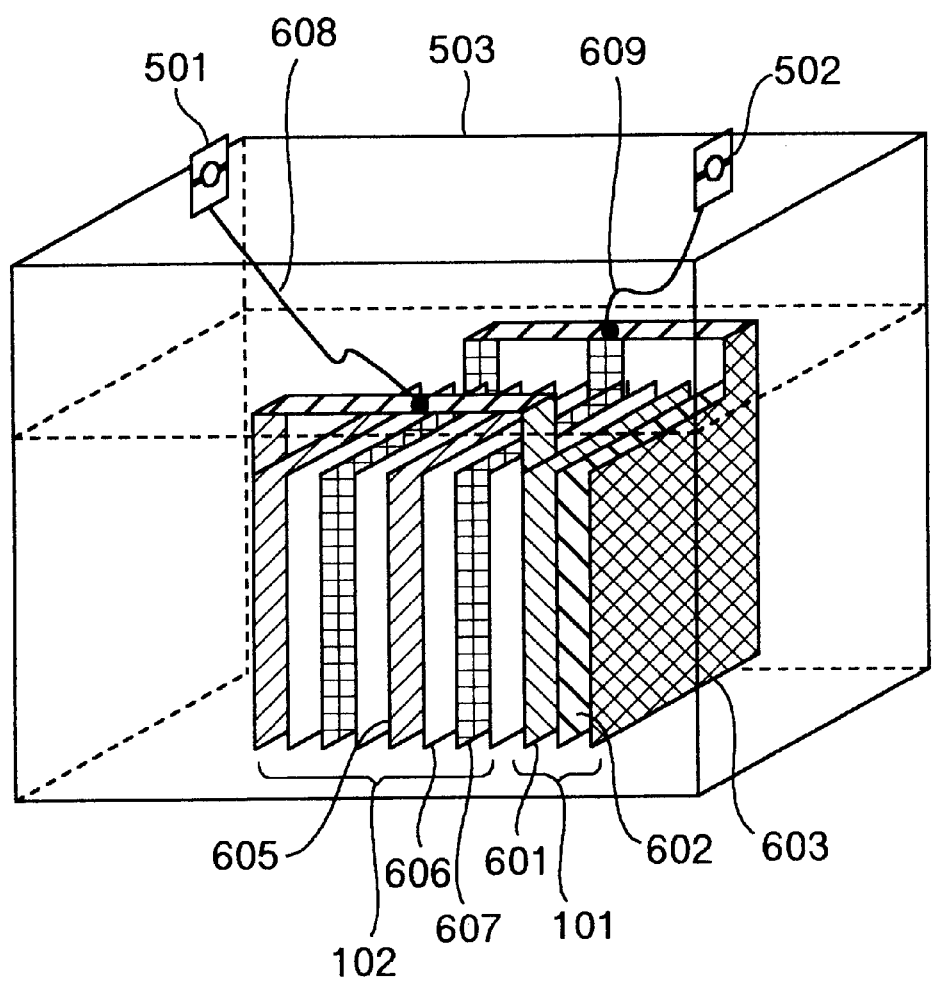
FIG. 8 is a diagram showing a seventh embodiment of the invention.

FIG. 8 is a diagram showing a seventh embodiment of the invention. In FIG. 8, the partitioning wall 604 of FIG. 6 is not included, and the component elements of the first cell 101 and the second cell 102 are accommodated in the same space. As a result, the electrolytic solution is also shared. This configuration can be realized by employing the aqueous solution of sulfuric acid as the electrolytic solution, the electrical double layer capacitor as the first cell 101, and the lead seal cell as the second cell 102. A similar configuration can be also realized by employing the aqueous solution of potassium hydroxide as the electrolytic solution, the electrical double layer capacitor as the first cell 101 and the nickel hydrogen cell as the second cell 102.

In the case under consideration, the electrodes of the first cell 101 and the second cell 102 and the separators 602, 606 are shown in laminate. Nevertheless, they can be implemented with other configurations such as in winding.

As an eighth embodiment of the invention, carbon fiber or carbon nanotube is desirably added to at least one of the electrodes (generally, a negative electrode) of the first cell 101 and the second cell 102 shown in FIG. 7 or 8. The use of the lithium secondary cell or the lead cell is accompanied by the expansion/contraction of the electrodes at the time of charge or discharge. The electrical double layer capacitor and the nickel hydrogen cell, on the other hand, are not accompanied by the expansion/contraction of the electrodes at the time of charge or discharge. In the case where these cells are accommodated in a common space, stress is exerted also on the electrical double layer capacitor and the nickel hydrogen cell for a considerably deteriorated performance. In view of this, carbon fiber or carbon nanotube is added to an electrode (generally, a negative electrode) thereby to relax the stress and prevent the performance deterioration.

Figure 9:
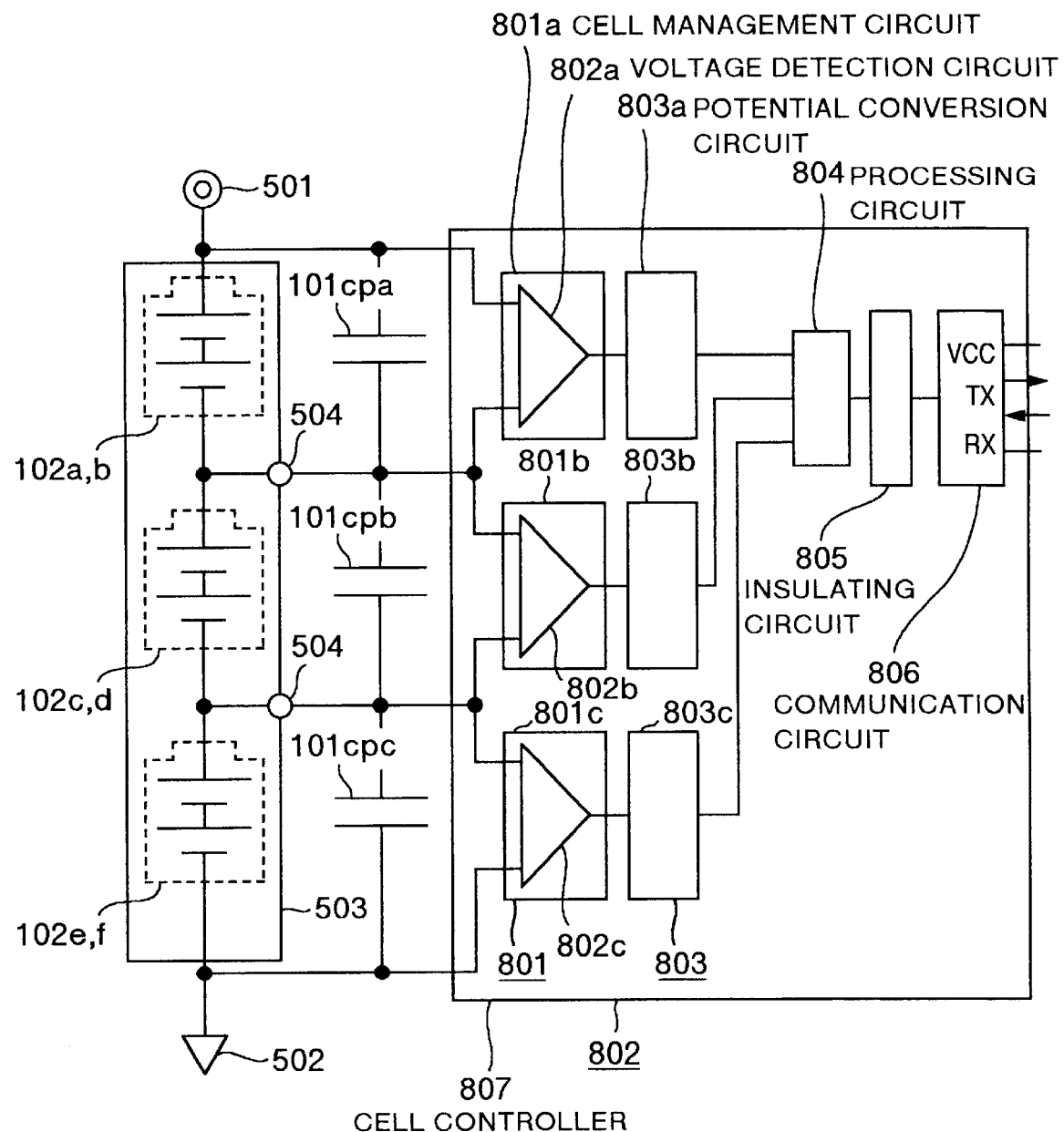
FIG. 9 is a diagram showing an eighth embodiment of the invention.

FIG. 9 is a diagram showing a ninth embodiment of the invention. In FIG. 9, a cell controller 807 is configured of cell management circuits 801a to 801c, voltage detection circuits 802a to 802c, potential conversion circuits 803a to 803c, a processing circuit 804, an insulating circuit 805 and a communication circuit 806. The first cells 101cpa to 101cpc are connected in parallel to the second cells 102a, 102b; 102c, 102d; 102e, 102f, respectively. A plurality of these parallel circuits (three stages in the case of FIG. 9) are further connected in series. Also, the cell management circuit 801 is connected in parallel to each of the parallel circuit pair (the second cells 102a, 102b with the first cell 101cpa, for example) including the first cells 101 and the second cells 102.

The cell management circuit 801 (801a to 801c) is connected to the processing circuit 804 through the potential conversion circuit 803 (803a to 803c). The processing circuit 804 is connected also to the communication circuit 806 through the insulating circuit 805. These component parts make up the cell controller 807.

The potential conversion circuit 803 (803a to 803c) converts the potential level of each parallel circuit detected by the cell management circuit 801 (801a to 801c) and transmits an electrical signal. Based on the terminal voltage of each parallel circuit pair, the processing circuit 804 determines the charged condition and the voltage balance of each parallel circuit pair, detects the residual discharge amount and the allowable input/output, and drives a bypass circuit. Also, the information signals including the allowable residual discharge value and the allowable input/output, after being insulated electrically in the insulating circuit 805, are transmitted through the communication circuit 806 to the power supply/load 104 or the charger/discharger 103. Character TX of the communication circuit designates transmission means, and RX receiving means.

The cell management circuit 801 (801a to 801c) has a voltage detection circuit 802 (802a to 802c) and a bypass circuit (not shown) for detecting the terminal voltage of each parallel circuit pair. Also, though not shown, the bypass circuit can be controlled to obviate the voltage imbalance of each parallel circuit pair.

The voltage imbalance is obviated, through the charger/discharge 103 described above, by equalization using a voltage at which the electrolytic solution of the second cells 102 of the second cells 102 is electrolyzed or a voltage at which the generated gas is recombined. In this way, by use of a bypass circuit, the size can be reduced and the effect of equalization is enhanced.

Figure 10:
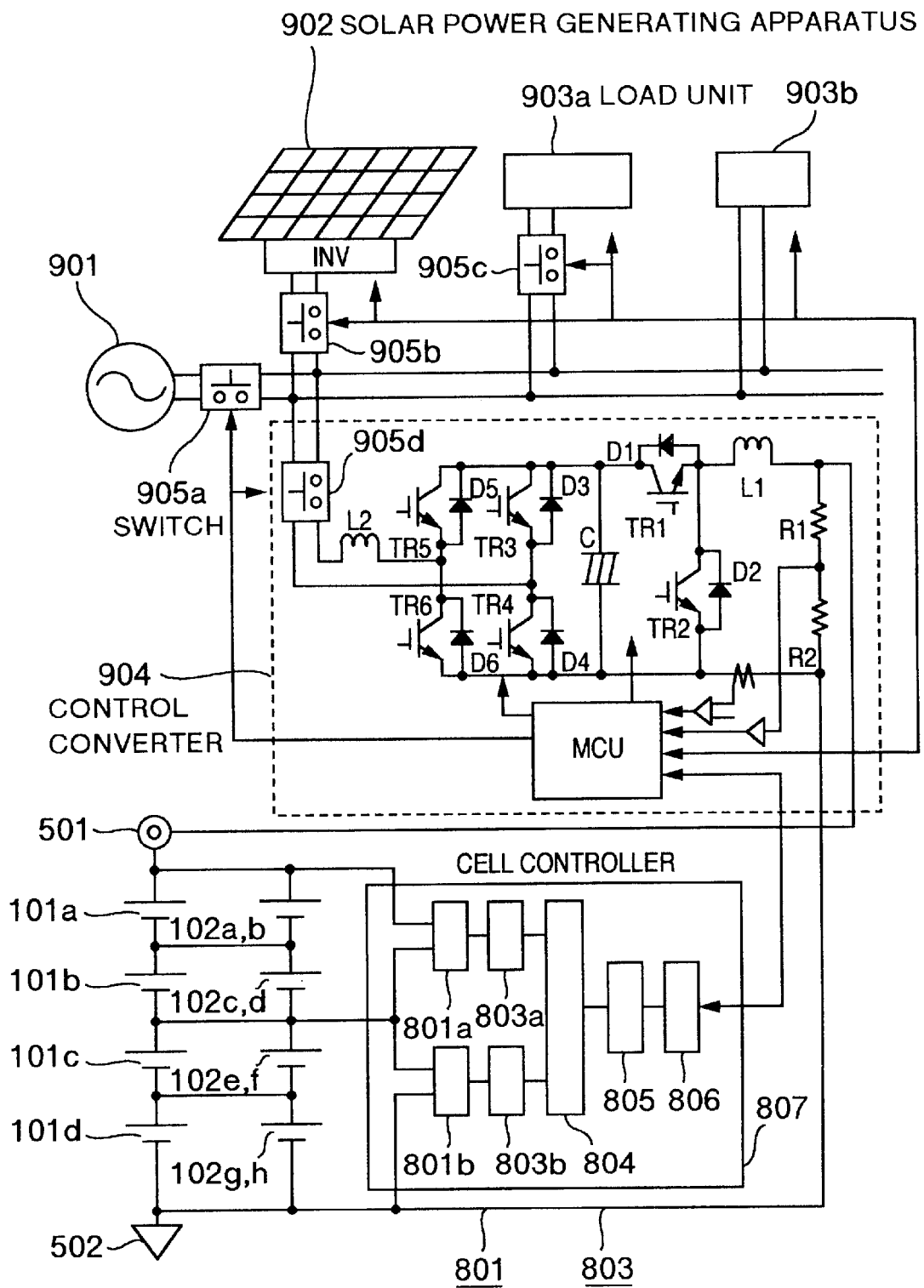
FIG. 10 is a diagram showing a power system combined with a solar power conversion apparatus using a power supply unit embodying the invention.

FIG. 10 shows a power supply system according to an embodiment of the invention, and is a diagram showing a distributed power supply system combined with the apparatus for converting the solar light into electric power according to an embodiment. In FIG. 10, numeral 901 designates a commercial power supply, numeral 902 a solar power generating apparatus, numerals 903a, 90b load units, numeral 904 a control converter, and numerals 905a, 905b, 905c switches. In FIG. 10, the first cells 110a to 101d are connected in parallel to the second cells 102a, 102b to 102g, 102h. A plurality of (four, in this embodiment) these parallel circuit pairs are further connected in series, and the series circuit is connected to the cell controller 807.

Also, the positive terminal 501 and the negative terminal 502 of the series circuit are connected to the control converter 904 corresponding to the charger/discharger 103 on the one hand, and the communication circuit 806 in the cell controller 807 is connected to the MCU in the control converter 904 at the same time.

Further, the commercial power supply 901, the solar power generating apparatus 902 and the load unit 903 corresponding to the power supply/load 104 are connected through the switches 905a to 905d to the control converter 904. Also, the solar power generating apparatus 902, the load unit 903, the control converter 904, the switches 905a to 905d and the cell controller 807 are connected to each other through bidirectional communication. The solar power generating apparatus 902 converts the solar light into DC power by a solar battery and outputs AC power through an inverter unit (INV).

The load unit 903a is a home electric appliance such as an air-conditioner, a refrigerator, an microwave oven or lighting equipment, or an electrical equipment such as a motor, an elevator, a computer or a medical equipment. The load unit 903b may be a second power supply unit. The control converter 904 is a charger/discharger for converting AC power to DC power or the other way around. A controller MCU controls the charge/discharge operation, the solar power generating apparatus 902 and the load unit 903. The MCU outputs a control signal to the switches 905a to 905d.

These devices may have a switch 905 within it. Also, the power supply unit according to the invention may be connected with the control converter 904 and other devices of other than the device configuration shown. According to this embodiment, the power required of the load unit 903, if it cannot be afforded by the commercial power supply 901 or the solar power generating apparatus 902, can be supplied from the cells through the control converter 904. As long as the power from the commercial power supply 901 or the solar power generating apparatus 904 is in oversupply, the power is stored in the cells through the control converter 904.

In the case where the terminal voltage of the cells reaches a discharge stop level or a charge stop level during the aforementioned operation, the cell controller 807 transmits the particular signal to the control converter 904, which controls the charge/discharge operation. Also, upon detection of a voltage imbalance of the cells, a bypass circuit, if any, is controlled to obviate the voltage imbalance.

Upon detection that the voltage imbalance is of such a level that cannot be obviated by the bypass circuit, the commercial power supply 901, the solar power generating apparatus 902, the load unit 903, the control converter 904 and the switch 905 are controlled to equalize at a voltage at which the electrolytic solution of the second cells 102 is electrolyzed or at which the generated gas is recombined. According to these embodiments, the contract power demand or the power consumption of the commercial power supply 901 or the power generation rating of the solar power generating apparatus 902 can be reduced, thereby saving the equipment expenditure and the running cost.

Also, during a certain time zone when the power consumption is concentrated, power is supplied from the power supply unit to the commercial power supply 901, while when the power consumption is small, the power is accumulated in the power supply unit. In this way, the concentration of the power consumption can be relaxed and the power consumption can be averaged out. Further, the MCU of the control converter 904 controls the load unit 903 by monitoring the power consumption of the load unit 903, and therefore the power is saved and the effective power utilization are achieved.

Figure 11:
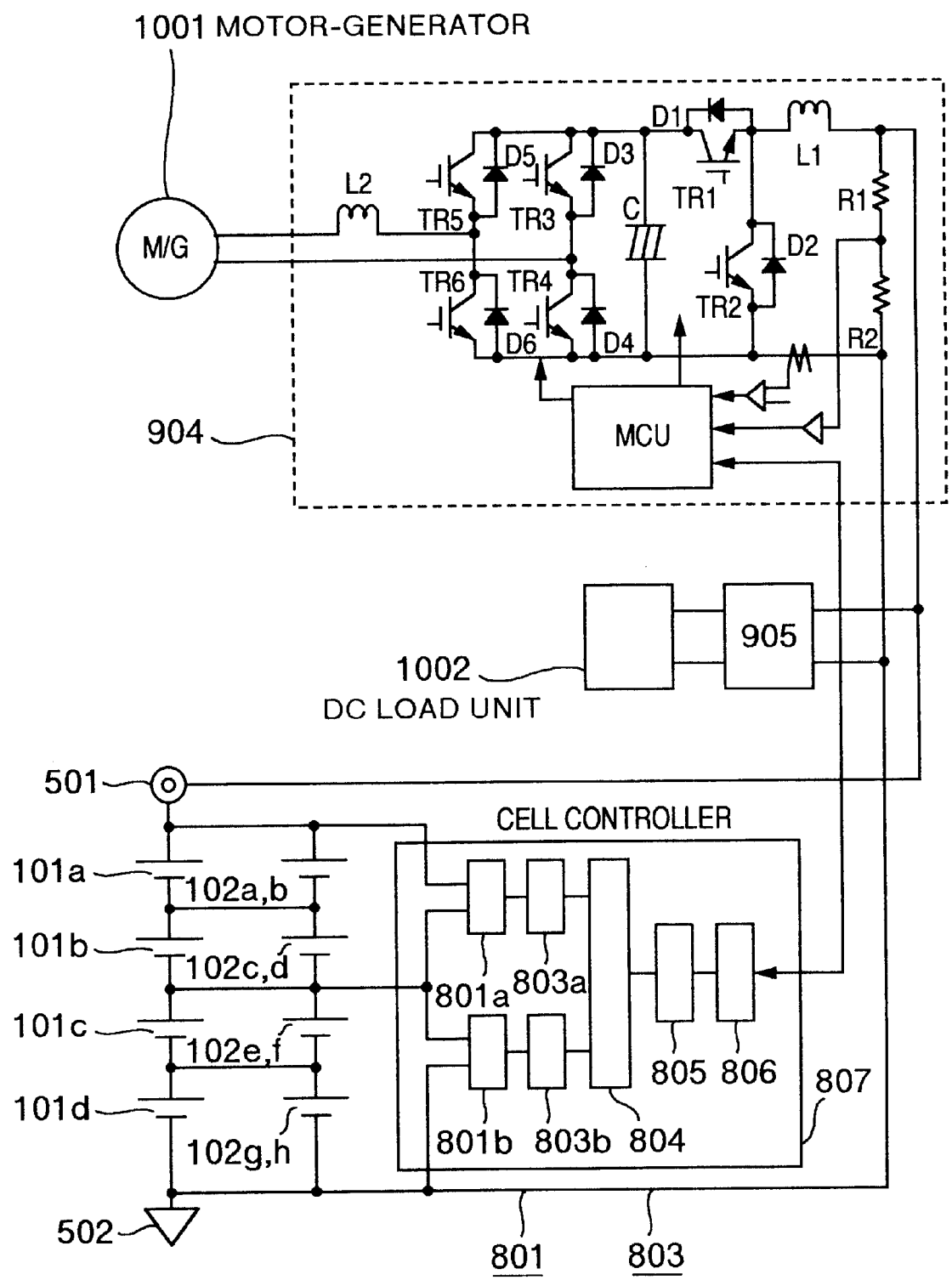
FIG. 11 is a diagram showing an example of an electric vehicle using a power supply unit embodying the invention.
Figure 12:
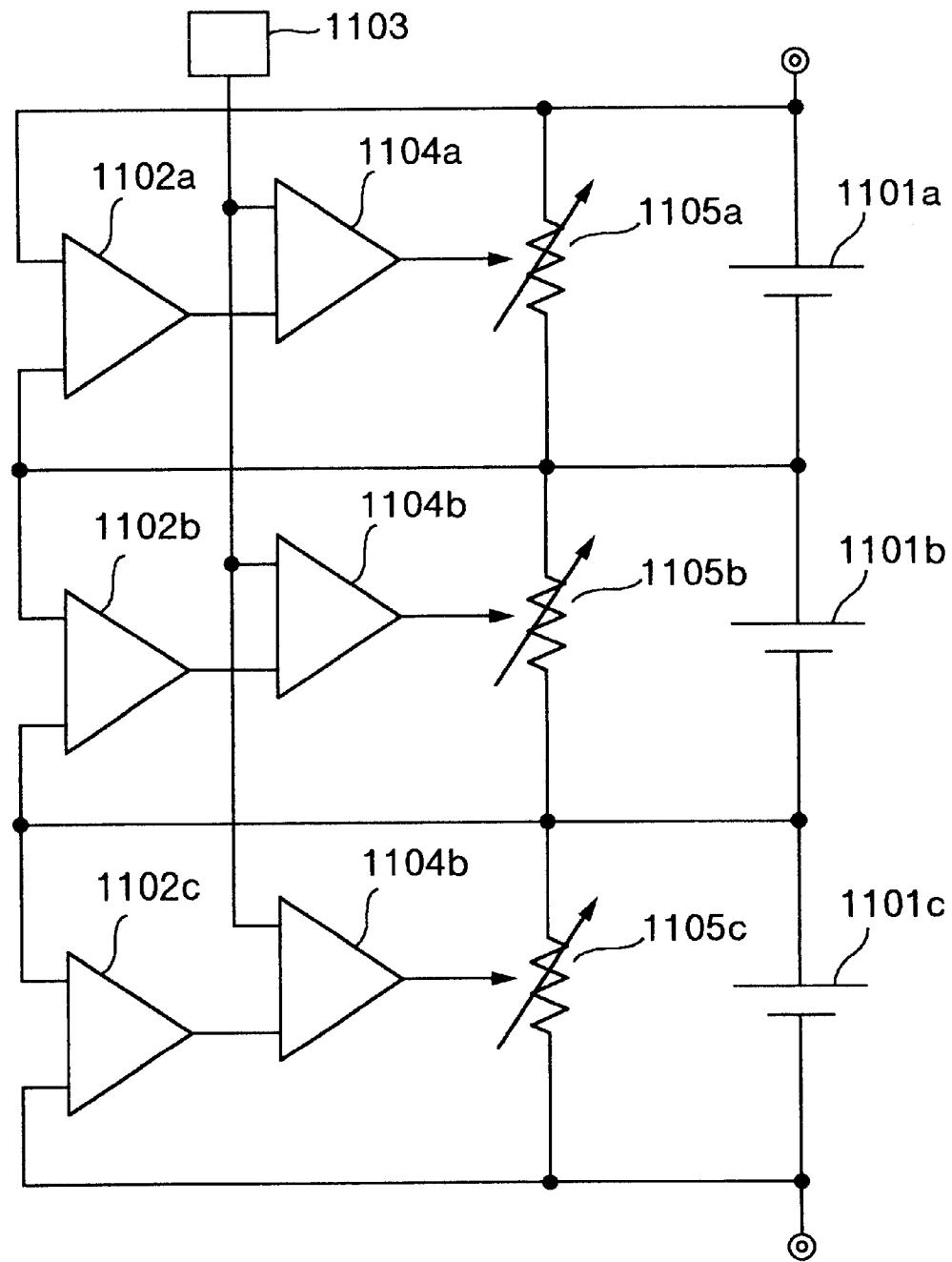
FIG. 12 is a diagram showing a conventional battery charging apparatus.

FIG. 11 shows an example of an electric vehicle using a power supply unit according to the invention. In FIG. 11, numeral 1001 designates a motor-generator for driving the vehicle, and numeral 1002 a DC load unit. The motor-generator 1001 is connected through the control converter 904 to the series circuit of a plurality of the cells. The motor-generator 1001 starts the engine, assists in supplying the drive force (powering) and generates power (regeneration). In powering mode, power is supplied from the power supply unit to the motor-generator 1001. In regeneration mode, on the other hand, power is supplied from the motor-generator 1001 to the power supply unit.

Also, the DC load unit 1002 is an electric load such as a solenoid valve or an audio equipment or a second power supply unit. The DC load unit 1002 is connected in series to the cells through the switch 905.

As a result, a vehicle can be realized in which the engine can be assisted in torque at the time of starting, and generative energy is converted to electric power and stored when braking the vehicle. Especially, this power supply unit uses the first cells, and therefore can be charged with large current. Thus, at the time of regeneration, the regenerative energy can be effectively utilized as charge power. This compares with the prior art, in which what is called the quick charge has been impossible, and therefore the corresponding portion has constituted thermal loss.

With the power supply unit according to the invention, the voltages of the cells connected in series parallel can be equalized on the one hand, and the power supply unit can be used as a distributed power supply system. Also, the application of the invention to an electric vehicle makes it possible to effectively utilize the regenerative power as charge power for the power supply unit.

It should be further understood by those skilled in the art that the foregoing description has been made on embodiments of the invention and that various changes and modifications may be made in the invention without departing from the spirit of the invention and scope of the appended claims.

What is claimed is:

1. A power supply unit comprising:
   at least one storage battery comprising a plurality of circuits connecting in series, each of the plurality of circuits including a first cell group and a second cell group connected in parallel; wherein said second cell group utilizes an electrolyzable electrolytic solution, or generates recombinable gas; and
   a charger/discharger for controlling charge/discharge of said storage battery adapted to charge said storage battery up to a voltage at which the electrolytic solution of said second cell group is electrolyzed, or to a voltage at which the generated gas is recombined.

2. A power supply unit according to claim 1, wherein said first cell group and said second cell group are connected in parallel through a current limiter.

3. A power supply unit according to claim 1, wherein the at least one storage battery comprises a plurality of said storage batteries connected in parallel.

4. A power supply unit according to claim 1, wherein the withstanding voltage of said first cell group is higher than the withstanding voltage of said second cell group.

5. A power supply unit according to claim 1, wherein each of the plurality of circuits includes a plurality of said second cell groups connected in series.

6. A power supply unit according to claim 1, wherein said first cell group and said second cell group share at least one component element.

7. A power supply unit according to claim 6, wherein said shared component element is the electrolytic solution.

8. A power supply unit according to claim 6, wherein at least selected one of said first cell group and said second cell group has an electrode formed of selected one of carbon fiber and carbon nanotube.

9. A power supply unit according to claim 1, wherein
   the first cell group of each of the plurality of circuits is connected to the first cell group of other circuits in series;
   the second cell group of each of the plurality of circuits is connected to the second cell group of other circuits in series; and
   the first cell group and the second cell group of each of the plurality of circuits are connected with an intermediate terminal.

10. A power supply unit according to claim 5, wherein
    the first cell group of each of the plurality of circuits is connected to the first cell group of other circuits in series;
    the second cell group of each of the plurality of circuits is connected to the second cell group of other circuits in series; and
    the first cell group and the second cell group of each of the plurality of circuits are connected with an intermediate terminal.

* * * * *